US007089040B2

(12) United States Patent
Iwabuchi et al.

(10) Patent No.: US 7,089,040 B2
(45) Date of Patent: Aug. 8, 2006

(54) PORTABLE RADIO COMMUNICATION APPARATUS

(75) Inventors: Kazuhiro Iwabuchi, Yokohama (JP); Masayoshi Dohata, Yokohama (JP)

(73) Assignee: Kyocera Corporation, Kyoto (JP)

( * ) Notice: Subject to any disclaimer, the term of this patent is extended or adjusted under 35 U.S.C. 154(b) by 609 days.

(21) Appl. No.: 09/768,712

(22) Filed: Jan. 24, 2001

(65) Prior Publication Data

US 2001/0011029 A1 Aug. 2, 2001

(30) Foreign Application Priority Data

Jan. 27, 2000 (JP) ............................ P2000-019183
Jan. 27, 2000 (JP) ............................ P2000-019184
Jan. 28, 2000 (JP) ............................ P2000-020702

(51) Int. Cl.
H04M 1/00 (2006.01)
(52) U.S. Cl. ...................................... 455/566; 455/347
(58) Field of Classification Search ................ 455/566, 455/550, 90, 347, 575, 91, 95, 73, 423, 557, 455/154.2, 158.2, 158.4–158.5, 575.8, 466, 455/550.1, 575.1, 575.3; 345/658, 1.1, 169, 345/905
See application file for complete search history.

(56) References Cited

U.S. PATENT DOCUMENTS

| 5,841,431 | A | | 11/1998 | Simmers |
| 5,896,575 | A | | 4/1999 | Higginbotham et al. |
| 6,415,138 | B1 | * | 7/2002 | Sirola et al. .................. 455/90 |
| 6,466,292 | B1 | * | 10/2002 | Kim ............................ 349/143 |
| 6,487,396 | B1 | * | 11/2002 | Sassi ............................ 455/90 |
| 6,510,325 | B1 | * | 1/2003 | Mack, II et al. ............. 455/550 |
| 6,583,770 | B1 | * | 6/2003 | Antila et al. ................. 345/1.1 |
| 6,587,700 | B1 | * | 7/2003 | Meins et al. ............. 455/575.8 |
| 6,697,083 | B1 | * | 2/2004 | Yoon ........................... 345/658 |
| 6,747,609 | B1 | * | 6/2004 | Antila et al. ................. 345/1.1 |
| 6,771,974 | B1 | * | 8/2004 | Sim et al. .................... 455/466 |
| 6,792,293 | B1 | * | 9/2004 | Awan et al. ................. 455/566 |
| 2001/0003707 | A1 | * | 6/2001 | Moriya ....................... 455/566 |

FOREIGN PATENT DOCUMENTS

CN 1168498 12/1997

(Continued)

Primary Examiner—Naghmeh Mehrpour
(74) Attorney, Agent, or Firm—Hogan & Hartson LLP

(57) ABSTRACT

An object is to provide a portable radio communication apparatus which allows a user to easily view displayed contents when the apparatus is folded even in the nighttime or in a dark place, and which can extend the battery life. A second case 4 is connected to a first case 2 so as to be in open and closed positions with respect to the first case 2. A main display section 11 which is exposed when the second case 4 is in the open position, a sub-display section 12 which is exposed whether the second case 4 is in the open or closed position, a main illuminating device 23A which illuminates the main display section 11, and a sub-illuminating device 23B which illuminates the sub-display section 12 are provided. A driver 24 which selects a line to supply electric power for illumination to the main illuminating device 23A or the sub-illuminating device 23B, and a detecting switch 22 which detects whether the second case 4 is in the open or closed position, are also provided. A control section 25 is also provided which controls the driver 24, with reference to the detected result, to supply electric power to the main illuminating device 23A when the second case 4 is in the open position, and to supply electric power to the sub-illuminating device 23B when the second case 4 is in the closed position.

7 Claims, 5 Drawing Sheets

FOREIGN PATENT DOCUMENTS

| | | |
|---|---|---|
| GB | 2-337891 | 12/1999 |
| JP | 4-049746 | 2/1992 |
| JP | 04-111655 | 4/1992 |
| JP | 06-037697 | 2/1994 |
| JP | 08-331631 | 12/1996 |
| JP | 10-215303 | 8/1998 |
| JP | 11-030226 | 2/1999 |
| JP | 11-068899 | 3/1999 |
| JP | 11-074953 | 3/1999 |
| JP | 11-196397 | 7/1999 |
| JP | 11-215218 | 8/1999 |
| JP | 2001-136095 | 5/2001 |
| JP | 2001-186227 | 7/2001 |
| KR | 00-274298 | 9/2000 |

\* cited by examiner

PORTABLE RADIO COMMUNICATION APPARATUS

BACKGROUND OF THE INVENTION

1. Field of the Invention

The present invention relates to portable radio communication apparatuses which employ various communication systems, and in particular, the present invention relates to foldable portable radio communication apparatuses.

2. Description of Related Art

Recently, portable communication apparatuses which employ communication systems which enable high-speed transmission of data, such as PDC (Personal Digital Cellular), CDMA (Code Division Multiple Access), GSM (Global System for Mobile Communication), and PHS (Personal Handy-phone System), are widely used. In addition, communication systems of the technologies of the next generation, such as WCDMA (Wide-band CDMA) and CDMA2000 are under development.

Among these types of portable radio communication apparatuses, ones having foldable structures so as to improve portability are known. However, a display section of such a portable radio communication apparatus of foldable type can not be seen from the outside when it is folded.

Therefore, there are portable radio communication apparatuses having structures such that the display function is maintained even when they are folded, which are provided with secondary display sections which can be seen from the outside even when the portable radio communication apparatuses are folded, as described in Japanese Unexamined Patent Application, First Publication (Kokai), No. Hei 6-37697.

However, even in a portable radio communication apparatus of this structure, there has been a problem that the contents on the exposed secondary display section are difficult to read in the nighttime or where illumination is dim.

Accordingly, one may consider providing each display section with a light to illuminate it; however, there has been a problem that such illumination of each display section with a light is a heavy load on the battery, and the battery runs out in a short time.

In addition, because of the provision of the secondary display section, there has been a problem that the above-described conventional portable radio communication apparatus consists of a large number of parts, which cause increase in the size of the case and damage the portability of the apparatus.

In particular, in order to allow each display section to display an image independently, each display section requires a driver which makes the display section display the image, and therefore the number of parts further increases, and the increase in the size was unavoidable.

In addition, with regard to the above conventional portable radio communication apparatus, if the second display section is disposed on the backside of the first display section, for example, a third person can view the second display when the user opens the portable radio communication apparatus in order to see the first display section.

In such a case, if the second display section is left on, there has been a possibility that the displayed contents can be seen, and there has been a problem that privacy may not be protected.

BRIEF SUMMARY OF THE INVENTION

The present invention was achieved in view of the above circumstances, and the objects of the present invention are as follows:

(1) To provide a portable radio communication apparatus which allows a user to easily view displayed contents when the apparatus is folded even in the nighttime or in a dark place, and which can extend the battery life.

(2) To provide a portable radio communication apparatus which can be produced with a reduced size without damaging portability, and which allows a user to view displayed contents even when the apparatus is folded.

(3) To provide a portable radio communication apparatus which provides protection of privacy from a third person.

In order to achieve the above object (1), a first aspect of the present invention is a portable radio communication apparatus which has a sound input device for inputting sound, a sound output device for outputting sound, an input device for inputting various signals, and a communication device for communicating various communication data such as audio data, text data, and image data, the portable radio communication apparatus including:

a first case, a second case which is rotatably connected to the first case and which can be in open and closed positions with respect to the first case, a first display which is exposed when the second case is in the open position, a second display which is exposed whether the second case is in the open or closed position, a first illuminator which illuminates the first display, a second illuminator which illuminates the second display, an electric power supply switch which can switch between lines to supply electric power for illumination to the first illuminator and the second illuminator, an open/closed position detector which detects whether the second case is in the open or closed position, and a controller which controls the electric power supply switch, with reference to what the open/closed position detector has detected, to supply electric power to the first illuminator when the second case is in the open position, and to supply electric power to the second illuminator when the second case is in the closed position.

Thus, since the controller controls the electric power supply switch so as to supply electric power only to the first illuminator, which illuminates the first display, when the second case is in the open position, and to supply electric power only to the second illuminator, which illuminates the second display, when the second case is in the closed position to cover the first display, displayed contents can be easily viewed even in the nighttime or in the dark by illuminating one of the displays depending on whether the second case is in the open or closed position, and the battery life can be extended by avoiding waste of electric power such as supplying electric power to the first illuminator when the second case is in the closed position, and the first display is covered, or supplying electric power to the second illuminator when the second case is in the open position, and the second display is not used.

In order to achieve the above object (2), a second aspect of the present invention is a portable radio communication apparatus which has a sound input device for inputting sound, a sound output device for outputting sound, an input device for inputting various signals, and a communication device for communicating various communication data such as audio data, text data, and image data, the portable radio communication apparatus including:

a first case, a second case which is rotatably connected to the first case and which can be in open and closed positions with respect to the first case, a first display which is exposed when the second case is in the open position, and a second display which is exposed whether the second case is in the open or closed position, wherein the first display and the second display are constituted by a unitary display device which can display on both a front side and a back side.

Thus, since the first display and the second display are constituted by a unitary display device which can display on both the front side and the back side, the number of parts can be largely reduced in comparison with the case where display devices and drivers for the display devices are provided for two displays, respectively, allowing a smaller and thinner design, and thereby a portable radio communication apparatus which has a full display function and improved portability can be produced.

In the above second aspect of the portable radio communication apparatus, the display device may be provided in either the first case or the second case, and the first case or the second case in which the display device is provided may have a window for the first display in the inner face and may have a window for the second display in the outer face.

In this case, the displayed contents on the display device disposed in the case can be viewed through the window for the first display provided in the inner face of the first case or the second case and through the window for the second display provided in the outer face of the case. The structure in which a unitary display device is disposed in the case allows a thinner design of the case which is provided with displays on the inner and outer faces.

In the above second aspect of the portable radio communication apparatus, the display device may have a first reflective plate on the opposite side to the window for the first display and may have a second reflective plate on the opposite side to the window for the second display.

In this case, the reflective plates provides extremely fine display on the unitary display device through the windows in the inner and outer faces.

In order to achieve the above object (3), a third aspect of the present invention is a portable radio communication apparatus which has a sound input device for inputting sound, a sound output device for outputting sound, an input device for inputting various signals, and a communication device for communicating various communication data such as audio data, text data, and image data, the portable radio communication apparatus including:

a first case, a second case which is rotatably connected to the first case and which can be in open and closed position with respect to the first case, a first display which is exposed when the second case is in the open position, a second display which is exposed whether the second case is in the open or closed position, an open/closed position detector which detects whether the second case is in the open or closed position, a display controller for directing display driving supply, which controls the first display and the second display to be turned on and off, with reference to what the open/closed position detector has detected, and a controller which controls the display controller for directing display driving supply to turn off the second display if the open/closed position detector has detected the second case being in the open position.

According to the above structure of the portable radio communication apparatus, when the second case is in the open position with respect to the first case, the open/close position detector detects the open state of the second case, and in response to this detected result, the second display is turned off by the display controller for directing display driving supply. Accordingly, the displayed contents on the second display, for example, personal information such as the telephone number of the opposite party displayed when receiving or making a call, can be prevented from being seen by a third person, and the privacy can be securely protected.

In the above third aspect of the portable radio communication apparatus, the second display may be disposed on the opposite side to the first display, and either the first case or the second case may have a window for the first display in the inner face and may have a window for the second display in the outer face.

According to the above structure of the portable radio communication apparatus, when a user of the portable radio communication apparatus is viewing displayed contents on the first display through the window for the first display, the privacy can be securely protected even if the window for the second display is unavoidably in a position which allows a third person to view the window for the second display.

DETAILED DESCRIPTION OF THE INVENTION

FIRST EMBODIMENT

An embodiment of a portable radio communication apparatus which corresponds to the first aspect of the present invention will be described in the following with reference to the drawings.

Figure 1:
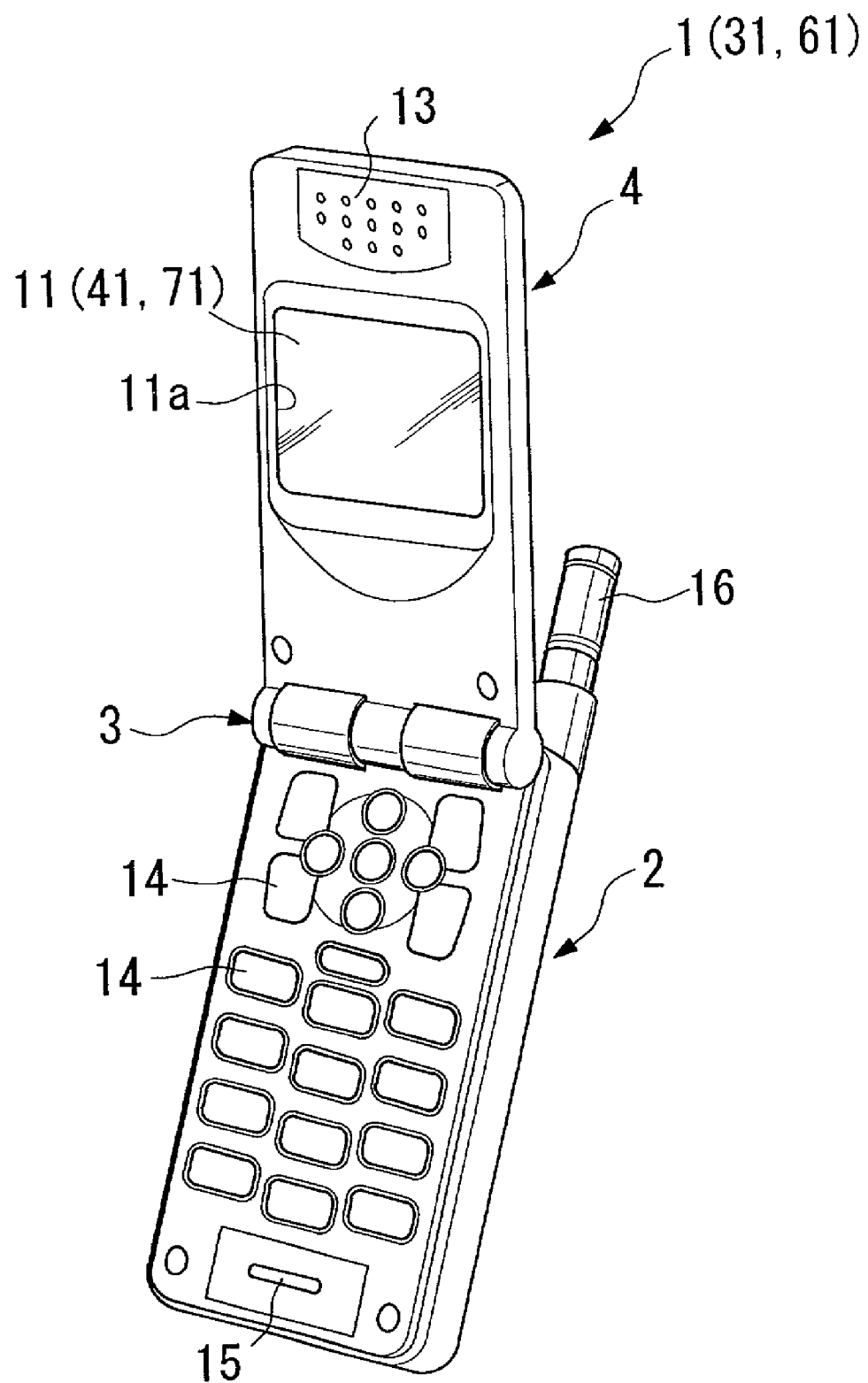
FIG. 1 is a perspective view of a portable radio communication apparatus, using which components and structure of the portable radio communication apparatus according to an embodiment of the present invention are described.
Figure 2:
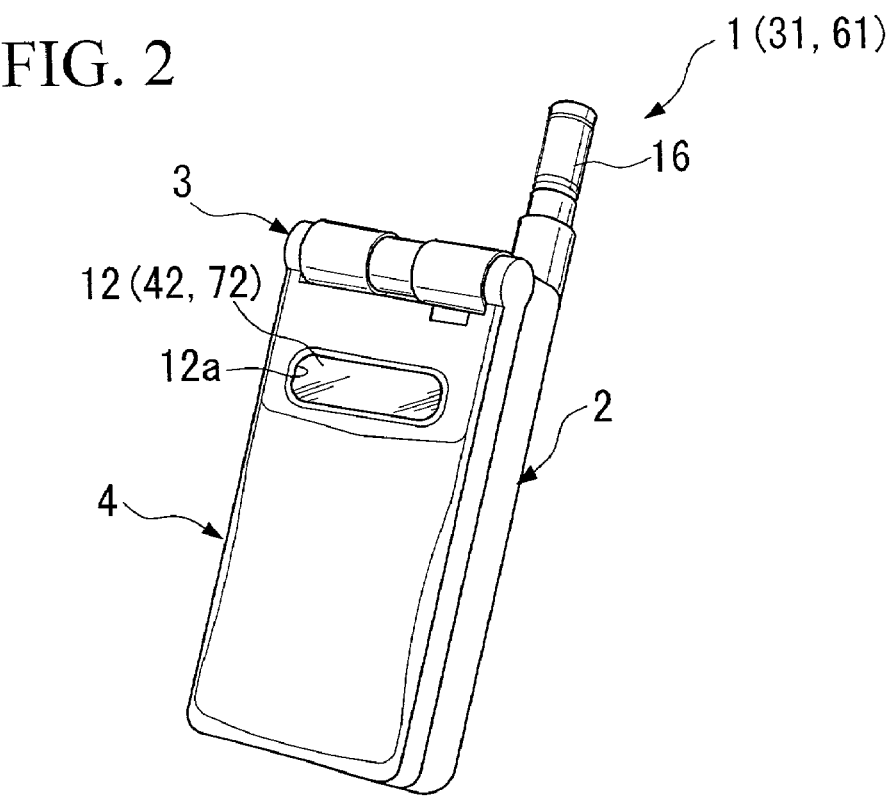
FIG. 2 is a perspective view of a portable radio communication apparatus which is folded, using which components and structure of the portable radio communication apparatus according to an embodiment of the present invention are described.

In FIGS. 1 and 2, reference numeral 1 indicates a portable radio communication apparatus. This portable radio communication apparatus has a first case 2 and a second case 4 which is rotatably connected to the upper portion of the first case 2 by a hinge 3. By rotating the second case 4 around the connection by the hinge 3, the second case 4 can be in open and closed positions with respect to the first case 2.

That is, by rotating the second case 4 from the closed position (the position shown in FIG. 2), the second case 4 comes to the open position (the position shown in FIG. 1). In contrast, by rotating the second case 4 in the open position to the opposite direction, the second case 4 comes to the closed position.

On the front side of the second case 4, which is a side to be put on the first case 2 when the second case 2 is in the closed position, a main display section (first display) 11 is provided. In addition, on the back side of the second case 4, a sub-display section (second display) 12 is provided. The main display section 11 and the sub-display section 12 are constituted by liquid crystal display panels, respectively, which are disposed in the positions facing a window 11a for the main display section (window for the first display) and a window 12a for the sub-display section (window for the second display), respectively. Various contents can be displayed on the main display section 11 and the sub-display section 12.

In the upper portion on the front side of the second case 4, a speaker (sound output device) 13 is provided.

On the front side of the first case 2, which is to be covered by the second case 4, a plurality of operation keys (input device) are provided, using which various inputting operations can be carried out.

In the lower portion on the front side of the first case 2, a microphone (sound input device) 15 is provided. In addition, in the vicinity of the upper portion on the back side, a retractable antenna 16 is provided, by which communication of various data such as audio data, text data, image data, and the like can be carried out.

With this portable radio communication apparatus 1, when the second case 4 is in the open position, input of sound is carried out using the microphone 15 in the second case 4, and the speaker 13 emits the voice of the opposite party, the alert sounds, alarms and the like.

Figure 3:
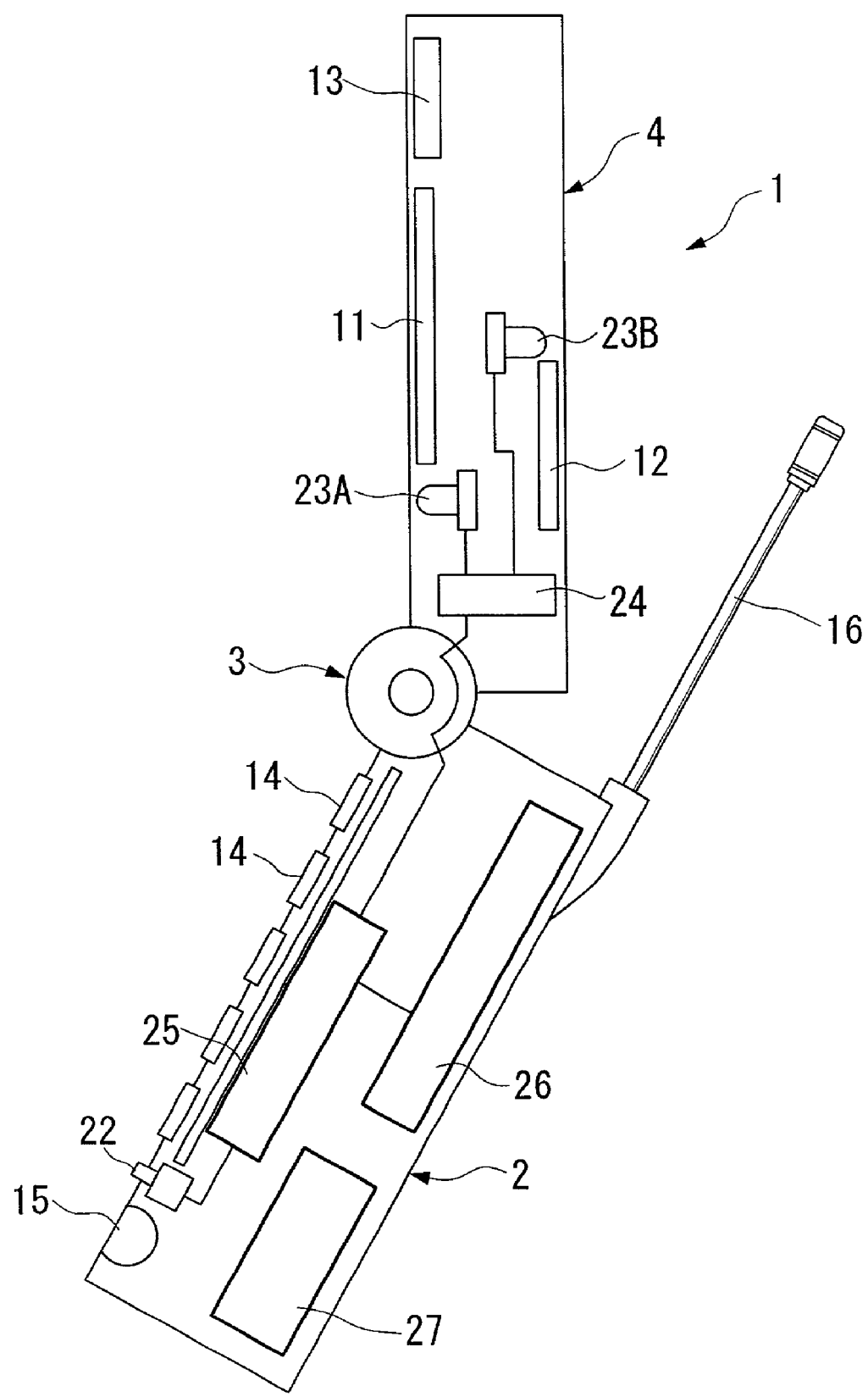
FIG. 3 is a functional block diagram, using which functions of a portable radio communication apparatus according to the first embodiment of the present invention is described.

Next, functions of the above portable radio communication apparatus 1 will be further described with reference to a functional block diagram shown in FIG. 3.

In this figure, reference numeral 22 indicates a detecting switch (open/closed position detector).

This detecting switch 22 detects whether the second case 4 is in the open or closed position with respect to the first case 2. The signal indicating the result of detection is output at the control section (controller) 25.

In the second case 4, a main illuminating device (first illuminator) 23A and a sub-illuminating device (second illuminator) 23B are provided. The main illuminating device 23A and the sub-illuminating device 23B illuminate the main display section 11 and the sub-display section 12, respectively.

A driver (electric power supply switch) 24 is connected to the main illuminating device 23A and the sub-illuminating device 23B. The driver 24 selects one of the lines to supply electric power from the battery 27 to the main illuminating device 23A or to the sub-illuminating device 23B.

A control section 25 is connected to the driver 24, and the control section 25 outputs a signal for controlling switching toward the driver 24 based on the signal from the detecting switch 22 indicating the result of detection.

A radio section (communication device) 26 sends various data, such as audio data, text data, and image data, to the telephone unit of the opposite party via the antenna 16 using a radiocommunication network, and receives such data from the telephone unit of the opposite party via the antenna 16 using a radiocommunication network.

From the communication data received by the radio section 26, audio data can be separated by a sound processing section, which is not shown in the drawings, and the sound can be emitted from the speaker 13. The sound inputted by the microphone 15 is introduced as a sound signal into the sound processing section, where the sound signal is converted into audio data, and the audio data are sent as communication data to the radio section 26, from which the communication data can be sent to the telephone unit of the opposite party via the antenna 16.

Next, control of the main illuminating device 23A and the sub-illuminating device 23B by the control section 25 will be described.

When the second case 4 is brought into the open position from the closed position, the control section 25 judges, from the signal from the detecting switch 22 indicating the result of detection, that the second case 4 is in the open position.

Then, the control section 25 outputs a signal to control switching to the driver 24 so as to supply the electric power from a battery 27 to the main illuminating device 23A to illuminate the main display section 11.

Accordingly, the electric power from the battery 27 is supplied to only the main illuminating device 23A via the driver 24, the main illuminating device 23A is turned on, and the main display device 11 is illuminated.

In contrast, when the second case 4 is brought into the closed position from the open position, the control section 25 judges, from the signal from the detecting switch 22 indicating the result of detection, that the second case 4 is in the closed position.

Then, the control section 25 outputs a signal to control switching to the driver 24 so as to supply the electric power from a battery 27 to the sub-illuminating device 23B to illuminate the sub-display section 12.

Accordingly, the electric power from the battery 27 is supplied to only the sub-illuminating device 23B via the driver 24, the sub-illuminating device 23B is turned on, and the sub-display device 12 is illuminated.

According to the above portable radio communication apparatus 1, when the second case 4 is in the open position, the control section 25 controls the driver 24 so that the electric power is supplied only to the main illuminating device 23A, which illuminates the main display section 11, and when the second case 4 is in the closed position, covering the main display section 11, the electric power is supplied only to the sub-illuminating device 23B, which illuminates the sub-display section 12. Therefore, even in the nighttime or in a dark place, either one of the main display section 11 and the sub-display section 12 is illuminated depending on whether the second case 4 is in the open or closed position, and the contents displayed thereon can be easily viewed. In addition, the battery life can be extended since waste of electric power can be avoided such that the electric power is sent to the main illuminating device 23A while the second case 4 is in the closed position, covering the main display section 11, or the electric power is sent to the sub-illuminating device 23B while the second case 4 is in the open position and the sub-display section 12 is not used.

SECOND EMBODIMENT

An embodiment of a portable radio communication apparatus which corresponds to the second aspect of the present invention will be described in the following with reference to the drawings. The appearance and the usage of the portable radio communication apparatus according to this embodiment are similar to those of the above first embodiment described with reference to FIGS. 1 and 2. Accordingly, description of the appearance and the usage of the second embodiment are omitted. The portable radio communication apparatus of this embodiment is indicated by reference numeral 31.

Figure 4:
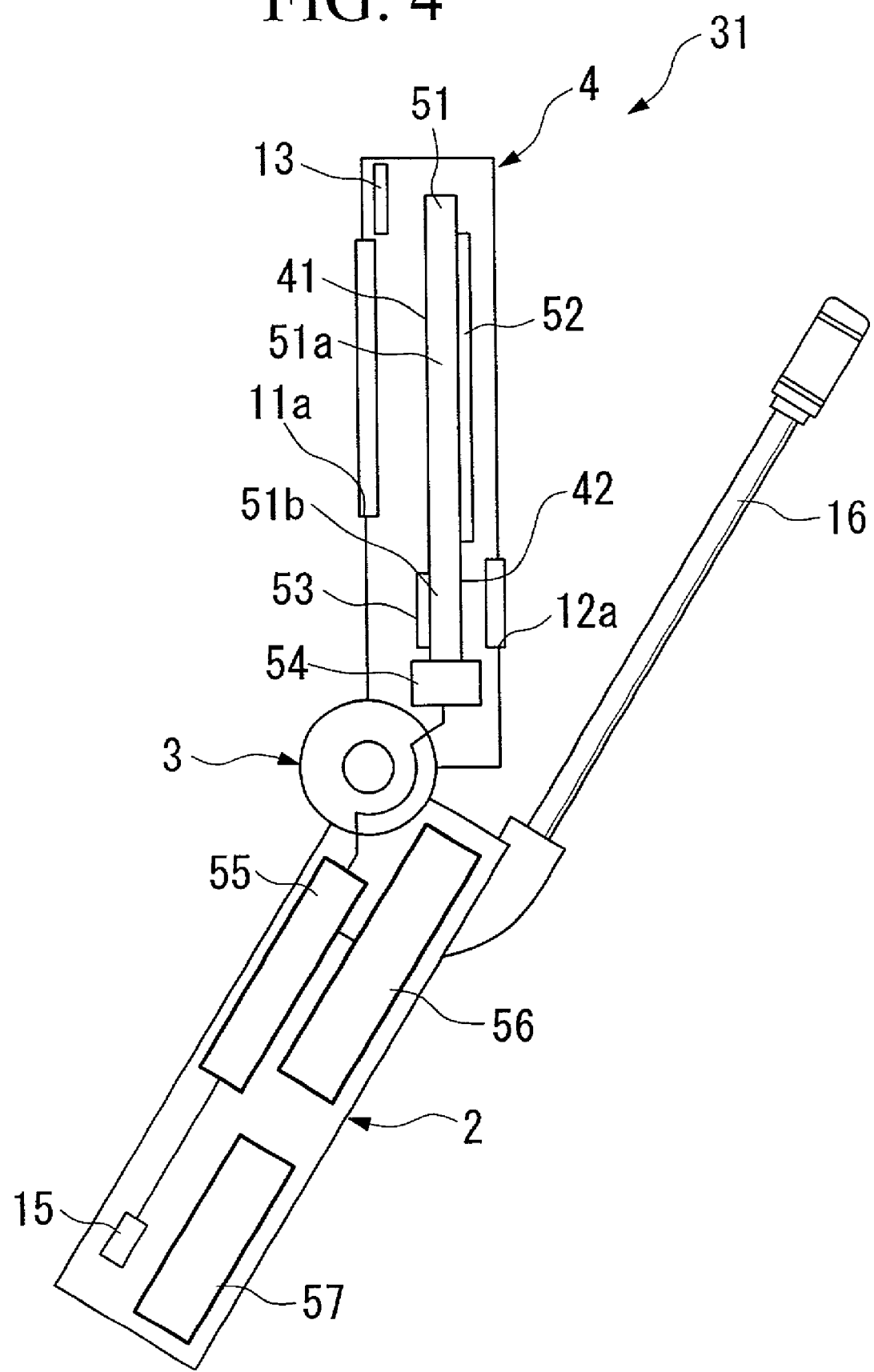
FIG. 4 is a functional block diagram, using which functions of a portable radio communication apparatus according to the second embodiment of the present invention is described.

Functions of the above portable radio communication apparatus 31 will be described with reference to the functional block diagram shown in FIG. 4.

In the drawings, reference numeral 51 indicates a display device 51, which is disposed in a second case 4. The display device 51 constituted by a unitary liquid display panel, which, in particular, can display on both a front side and a back side. The display device 51 is provided with a reflective plate 52 for the main display section (first reflective plate) and a reflective plate 53 for the sub-display section (second reflective plate) on the front and back sides. In the display device 51, a portion where the reflective plate 52 for the main display section is provided is a main display device portion 51a, which constitutes the main display section (first display) 41, and a portion where the reflective plate 53 for the sub-display section is provided is a sub-display device portion 51b, which constitutes the sub-display section (second display) 42. The main display device portion 51a and the sub-display device portion 51b are disposed so as to face a window 11a for the main display section (window for the first display), which is opened in the front surface of the second case 4, and a window 12a for the sub-display section (window for the second display), which is opened in the back surface of the second case 4, respectively.

The display device 51 is provided with a display driver 54 at an end, with which the display device 51 can display contents.

The display driver 54 is connected to a control section 55 which is provided in the first case 2. The control section 55 outputs control signals.

A radio section (communication device) 56 is similar to the radio section 26 in the first embodiment, and description thereof is omitted.

Reference numeral 57 indicates a battery, which supplies all electric power for the portable radio communication apparatus 31.

With the above portable radio communication apparatus 31, the display driver 54 is driven by control signals from the control section 55, and the display device 51 displays a variety of text-based information and image-based information.

Contents displayed by the main display device portion 51a of the display device 51 can be viewed through the window 11a for the main display section, and contents displayed by the sub-display device portion 51b of the display device 51 can be viewed through the window 12a for the sub-display section. That is, the contents generated by the main display device portion 51a is displayed on the main display section 41, and the contents generated by the sub-display device portion 51b is displayed on the sub-display section 42.

Accordingly, when the second case 4 is in the open position, contents displayed on the main display section 41 and the sub-display section 42 can be viewed, and when the second case 4 is in the closed position, the contents displayed on the sub-display section 42 can be viewed.

Thus, since the main display section 41 and the sub-display section 42 are constituted by the unitary display device 51 which can display on both the front side and the back side in the above portable radio communication apparatus 31, the number of parts can be largely reduced in comparison with the case where display devices and drivers for the display devices are provided for the two display sections, respectively, allowing a smaller and thinner design, and thereby the portable radio communication apparatus 31, which has a full display function and improved portability, can be produced.

In addition, through the window 11a for the main display section, which is opened in the front side of the second case 4, and through the window 12a for the sub-display section, which is opened in the back side of the second case 4, contents displayed by the display device 51, which is disposed in the second case 4, can be easily viewed.

Moreover, the reflective plate 52 for the main display section and the reflective plate 53 for the sub-display section provide extremely fine view of the contents displayed by the display device 51 through the window 11a for the main display section and the window 12a for the sub-display section.

In the above example, the display device 51 is disposed in the second case 4 so that the second case 4 has the main display section 41 and the sub-display section 42; however, the display device 51 may be disposed in the first case 2 so that the first case 2 has the main display section 41 and the sub-display section 42.

THIRD EMBODIMENT

An embodiment of a portable radio communication apparatus which corresponds to the third aspect of the present invention will be described in the following with reference to the drawings. The appearance and the usage of the portable radio communication apparatus according to this embodiment are similar to those of the above first embodiment described with reference to FIGS. 1 and 2. Accordingly, description of the appearance and the usage of the second embodiment are omitted. The portable radio communication apparatus of this embodiment is indicated by reference numeral 61.

Action of the above portable radio communication apparatus 61 will be described with reference to the functional block diagram shown in FIG. 5.

Figure 5:
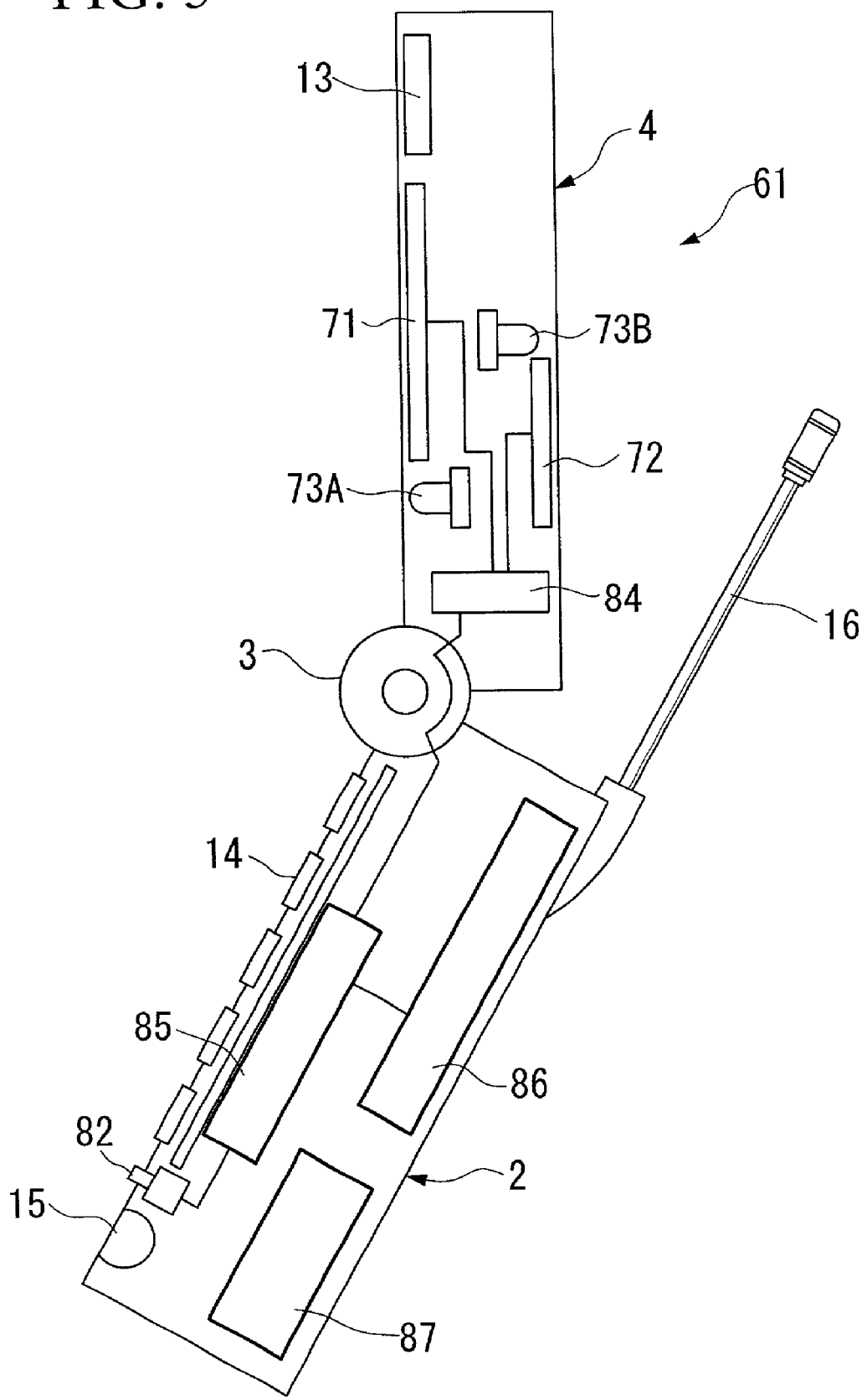
FIG. 5 is a functional block diagram, using which functions of a portable radio communication apparatus according to the third embodiment of the present invention is described.

In FIG. 5, reference numeral 82 indicates a detecting switch (open/closed position detector).

The detecting switch 82 detects whether the second case 4 is in the open or closed position with respect to the first case 2, and outputs a signal indicating the result of detection to a control section (controller) 85.

The second case 4 is provided with a main illuminating device 73A and a sub-illuminating device 73B. The main illuminating device 73A and the sub-illuminating device 73B illuminate a main display section (first display) 71 and a sub-display section (second display) 72, respectively.

A change-over switch (display controller for directing display driving supply) 84 is connected to the main display section 71 and the sub-display section 72. The change-over switch 84 selects one of the main display section 71 and the sub-display section 72 for supplying electric power from a battery 87 and a variety of information from the control section 85.

That is, the control section 85 is connected to the change-over switch 84 so that the control section 85 can output signals for controlling switching to the change-over switch 84 with reference to the signal from the detecting switch 82 indicating the result of detection.

Reference numeral 87 indicates a battery, which supplies all electric power for the portable radio communication apparatus 61.

A radio section (communication device) 86 is similar to the radio section 26 in the first embodiment, and description thereof is omitted.

Next, control of the main display section 71 and the sub-display section 72 by the control section 85 will be described.

When the second case 4 is brought into the closed position from the open position, on the basis of the signal from the detecting switch 82 indicating the result of detection, which comprises, for example, a contact switch, the control section 85 judges that the second case 4 is in the closed position.

In response to the judgement, the control section 85 outputs a signal to control switching to the change-over switch 84 so as to supply electric power from the battery 87 to the sub-display section 72 to turn it on.

Accordingly, the electric power from the battery 87 is supplied, for example, only to the sub-display section 72 via the change-over switch 84, and in addition a variety of information from the control section 85 is transmitted only to the sub-display section 72 and displayed thereon.

Next, when the second case 4 is brought into the open position from the closed position, on the basis of the signal from the detecting switch 82 indicating the result of detection, the control section 85 judges that the second case 4 is in the open position.

In response to the judgement, the control section 85 outputs a signal to control switching to the change-over switch 84 so as to stop supply of electric power and transmission of information to the sub-display section 72 to turn it off, and start supplying electric power to the main display section 71 to turn it on.

Accordingly, the electric power from the battery 87 is supplied only to the main display section 71 via the changeover switch 84, and in addition a variety of information from the control section 85 is transmitted only to the main display section 71 and displayed thereon.

Therefore, it is possible to prevent any information from being obtained from the sub-display section 72 when the second case 4 is in the open position.

Figure 6:
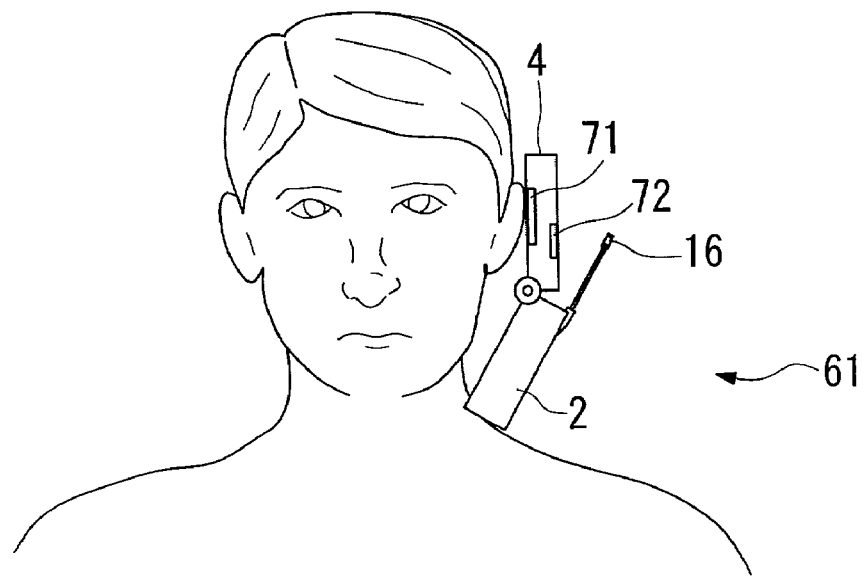
FIG. 6 is an illustration of the condition in which a portable radio communication apparatus according to the third embodiment of the present invention is being used.

Thus, with the portable radio communication apparatus according to this embodiment, only when the second case 4 is in the closed position, the sub-display section 72 is on, and the condition of operation can be seen even though the main display section 71 is covered. In addition, when the second case 4 is in the open position, and the user is viewing the main display section 71, the sub-display section 72 is turned off, and thereby the privacy can be protected without a risk that some information on the sub-display section 72 is seen, even when the sub-display section 72 is in such a position that a third person can see it as shown in FIG. 6, for example.

In this embodiment, although the electric power from the battery 87 and a variety of information from the control section 8 are supplied only to the sub-display section 72 when the second case 4 is in the closed position, the invention is not limited to such a function, and the electric power from the battery 87 and a variety of information from the control section 85 may be supplied to the main display section 71 and the sub-display section 72 to leave on both display sections 71 and 72.

Although the second case 4 is provided with the main display section 71 and the sub-display section 72 in this embodiment, the invention is not limited to such a construction, and the first case 2 may be provided with the main display section 71 and the sub-display section 72, for example, or one of the first case 2 and the second case 4 may be provided with the main display section 71 while the other case is provided with the sub-display section 72.

In this embodiment, an electric power supply switch may be provided which switches between lines to supply electric power for illumination to the main illuminating device 73A and the sub-illuminating device 73B with reference to the signal from the detecting switch 82 indicating the result of detection. In this case, by controlling the on/off state of the main illuminating device 73A and the sub-illuminating device 73B so as to synchronize with the on/off state of the main display section 71 and the sub-display section 72, waste of electric power can be avoided, and the battery life can be extended.

What is claimed is:

1. A portable radio communication apparatus which has a sound input device for inputting sound, a sound output device for outputting sound, an input device for inputting various signals, and a communication device for communicating various communication data including audio data, text data, and image data, the portable radio communication apparatus comprising:
   a first case;
   a second case which is connected to the first case so as to rotate between a fully open position, in which the second display is in an unused condition, and a fully closed position, in which the second display is in a used condition, with respect to the first case;
   a first display which is exposed when the second case is in the fully open position;
   a second display which is exposed regardless of whether the second case is opened or closed;
   a first illuminator which illuminates the first display;
   a second illuminator which illuminates the second display;
   an electric power supply switch which can switch between lines to supply electric power for illumination to the first illuminator and the second illuminator;
   an open/closed position detector which detects whether the second case is in the fully open position or the fully closed position; and
   a controller which controls the electric power supply switch, with reference to what the open/closed position detector has detected, to automatically supply electric power to the first illuminator only when the second case is in the fully open position, so that the first display is automatically illuminated only when the second case is in the fully open position, and to automatically not supply power to the second illuminator when the second case is in the fully open position so that the second display is automatically not illuminated, and to automatically supply electric power to the second illuminator only when the second case is in the fully closed position, so that the second display is automatically illuminated only when the second case is in the fully closed position.

2. A portable radio communication apparatus which has a sound input device for inputting sound, a sound output device for outputting sound, an input device for inputting various signals, and a communication device for communicating various communication data including audio data, text data, and image data, the portable radio communication apparatus comprising:

a first case;

a second case which is connected to the first case so as to rotate between a fully open position, in which the second display is in an unused condition, and a fully closed position, in which the second display is in a used condition, with respect to the first case;

a first display which is exposed when the second case is in the fully open position; and a second display which is exposed regardless of whether the second case is opened or closed;

wherein the first display and the second display are constituted by a unitary display device which can display on both a front side and a back side, and wherein the first display is automatically illuminated only when the second case is in the fully open position, and wherein the second display is automatically illuminated only when the second case is in the fully closed position.

3. A portable communication apparatus according to claim 2, wherein the display device is provided in either the first case or the second case, and the first case or the second case in which the display device is provided has a window for the first display in the inner face and has a window for the second display in the outer face.

4. A portable radio communication apparatus according to claim 3, wherein the display device has a first reflective plate on the opposite side to the window for the first display and has a second reflective plate on the opposite side to the window for the second display.

5. A portable radio communication apparatus which has a sound input device for inputting sound, a sound output device for outputting sound, an input device for inputting various signals, and a communication device for communicating various communication data including audio data, text data, and image data, the portable radio communication apparatus comprising:

a first case;

a second case which is connected to the first case so as to rotate between a fully open position, in which the second display is in an unused condition, and a fully closed position, in which the second display is in a used condition, with respect to the first case;

a first display which is exposed when the second case is in the open position, opened;

a second display which is exposed regardless of whether the second case is opened or closed;

an open/closed position detector which detects whether the second case is in the fully open position or fully closed position;

a display controller for directing a display driving supply, which controls the first display and the second display to be turned on and off, with reference to what the open/closed position detector has detected, and a controller which controls the display controller for directing the display driving supply so that the first display is automatically illuminated and the second display is automatically turned off only when the second case is in the fully open position, and the second display is automatically illuminated only when the second case is in the fully closed position.

6. A portable radio communication apparatus according to claim 5, wherein the second display is disposed on the opposite side to the first display, and either the first case or the second case has a window for the first display in the inner face and has a window for the second display in the outer face.

7. A portable radio communication apparatus according to claim 5, wherein the controller which controls the display controller for directing the display driving supply to turn off the first display if the open/closed position detector has detected the second case being in the closed position.

\* \* \* \* \*